3,511,828
MONOAZO DYES OF THE PYRAZOLONE SERIES

Peter Dimroth and Kurt Mayer, Ludwigshafen (Rhine), Germany, assignors to Badische Anilin- & Soda-Fabrik Aktiengesellschaft, Ludwigshafen (Rhine), Germany
No Drawing. Filed June 6, 1967, Ser. No. 643,820
Claims priority, application Germany, June 15, 1966,
B 87,564
Int. Cl. C09b 29/22; D06p 1/04
U.S. Cl. 260—162  5 Claims

ABSTRACT OF THE DISCLOSURE

Azo dyes from 3-aminobenzanilide or 4-aminobenzanilide and 1 - phenyl - 3 - carbalkoxypyrazolones which are useful for dyeing polyester textile material.

---

It is known from many publications, for example U.S. patent specifications No. 3,130,190 and No. 2,898,178, that azo dyes having pyrazolone derivatives as coupling components may in many cases be used as disperse dyes. It is very difficult however from the profusion of known and conceivable dyes of this type, to discover individual dyes which will give on polyester materials dyeings having a level of fastness which will satisfy present-day requirements. In fact it is often found that certain properties change in opposite directions; this is the case in particular with affinity and resistance to thermosetting for polyester dyes of the azo-pyrazolone series which are resistant to thermosetting do not usually have high tinctorial strength, while dyes which go on well have inadequate resistance to thermosetting.

We have now found that compounds having the general formula

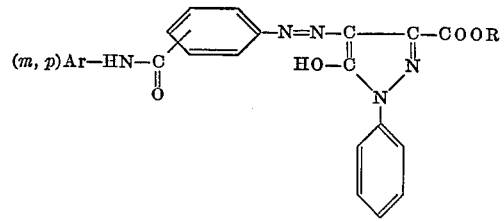

in which Ar denotes a phenyl, chlorophenyl, bromophenyl, low molecular weight alkylphenyl or alkoxyphenyl radical, and R denotes a low molecular weight alkyl group, and wherein the arylamide group (Ar—NH—CO—)

is situated in meta-position or para-position to the azo bridge, are disperse dyes which not only have high tinctorial strength but are also resistant to thermosetting.

Dyes having the above formula in which Ar denotes a phenyl group, chlorophenyl group, methylphenyl group, methoxyphenyl group or ethoxy phenyl group in meta-position or para-position to the azo bridge and R denotes a methyl group or an ethyl group are of special interest.

The said dyes may be obtained by diazotizing an aminobenzanilide having the general formula

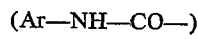

in which Ar has the meaning given above and coupling the diazonium salt onto 1-phenylpyrazolone-(5) carboxylic ester-(3).

Examples of specific substituents for Ar are chlorine atoms, bromine atoms, methyl groups, ethyl groups, propyl groups, methoxy groups and ethoxy groups. R may be particularly a methyl group, ethyl group or propyl group.

The new dyes are eminently suitable for the high temperature method of dyeing polyester material such as fibers, flock, filaments, threads, and woven and knitted fabrics. The dyeings have excellent fastness properties, particularly fastness to thermosetting.

In many cases good affinity of the dyes according to the invention is achieved even by the carrier method when a mixture of dyes is used instead of individual dyes.

The following examples illustrate the invention. References hereinafter to parts and percentages are by weight.

EXAMPLE 1

24.2 parts of 3 - aminobenzoic - meta - anisidide is diazotized in 100 parts of 20% hydrochloric acid with a solution of 7.1 parts of sodium nitrite in 20 parts of water. The clear diazonium salt solution is added at 0° to 5° C. to a solution of 23.5 parts of 1-phenylpyrazolone-(5) - carboxylic - (3) - ethyl ester in a caustic soda solution from 150 parts of water and 4 parts of sodium hydroxide. 100 parts of sodium carbonate decahydrate is then added. The deposited coupling product is suction filtered, suspended in water and the suspension is acidified with hydrochloric acid while cooling. The dye is then suction filtered, washed until neutral and dried. 41.8 parts (86.2% of the theory) of a yellow dye is obtained which gives a deep dyeing having very good fastness to light and heat setting on polyester fibers by the high temperature method.

The dyes of Examples 2 to 7 in the following tables are prepared by a method analogous to that of Example 1.

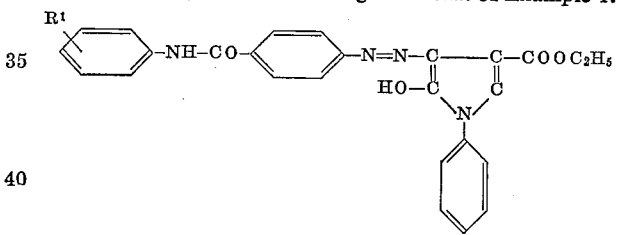

| Example No. | R¹ | Shade on polyester fiber |
|---|---|---|
| 2 | Para-CH₃ | Yellow. |
| 3 | Meta-CH₃ | Do. |
| 4 | Para-OCH₃ | Do. |
| 5 | Meta-OCH₃ | Do. |
| 6 | Meta-Cl | Do. |

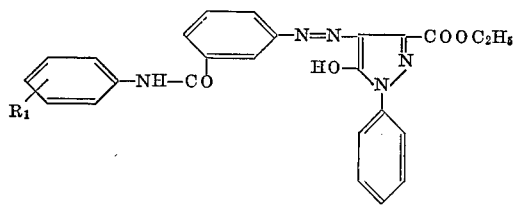

EXAMPLE 8

21.2 parts of 4-aminobenzanilide is dissolved at 10° to 15° C. in 110 parts of concentrated sulfuric acid and at +5° C. a nitrosylsulfuric acid (prepared from 7.1 parts of sodium nitrite and 23 parts of concentrated sulfuric acid) is gradually added. The whole is stirred for one hour at +5° C. and the solution is diluted with a mixture of 20.4 parts of glacial acetic acid and 18.4 parts of concentrated sulfuric acid, the whole being poured after another half an hour onto 500 parts of ice. A clear diazo solution is obtained to which at 0° to 5° C. a solution of 23.5 parts of 1-phenylpyrazolone-(5)-carboxylic-(3)-ethyl ester in 135 parts of glacial acetic acid is added. The mixture containing mineral acid is neutralized with 10% caustic soda solution, while adding ice, until diazo compound can no longer be detected. The deposited dye is suction filtered, washed until neutral and dried. 32.5 parts of dye is obtained, i.e. 71.5% of the theory. The dye gives on polyester a deep yellow dyeing having very good light fastness, fastness to thermosetting and fastness to washing.

EXAMPLE 9

In each case two dyes as specified in the following table and obtained analogously to the above examples, are mixed for example in the ratio 1:1, by common dissolution in N-methylpyrrolidone and reprecipitation with water. Upon dyeing polyester by the carrier method with these dye mixtures clearly deeper dyeings are obtained than with the use of the individual dyes:

Example No.:   Dye mixture from the dye of examples:
 (a) ------------------------------------- 3+4
 (b) ------------------------------------- 9+4
 (c) ------------------------------------- 2+3
 (d) ------------------------------------- 2+7

We claim:
1. A dye having the formula:

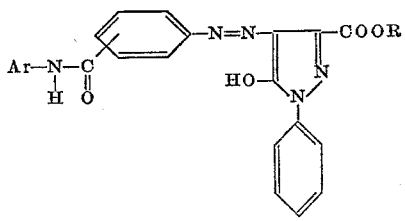

in which Ar denotes a member selected from the class consisting of a phenyl, chlorophenyl, bromophenyl, methylphenyl, methoxyphenyl and ethoxyphenyl, the Ar—NH—CO— group being bound in the meta- or para-position to the azo bridge and R denotes lower alkyl.

2. Compounds according to claim 1 having the general formula:

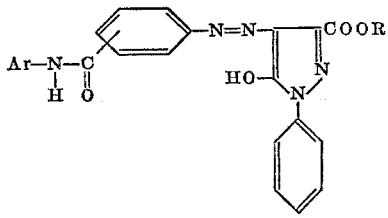

in which Ar denotes a member selected from the class consisting of phenyl, chlorophenyl, methylphenyl, methoxyphenyl and ethoxyphenyl. The Ar—NH—CO— group being bound in the meta- or para-position to the azo bridge and R denotes a member selected from the class consisting of methyl and ethyl.

3. The compound of the formula:

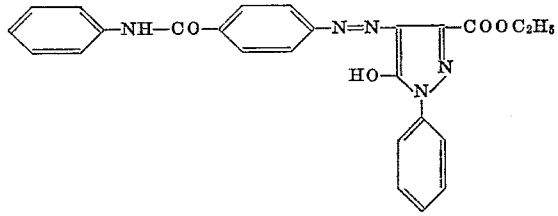

4. The compound of the formula:

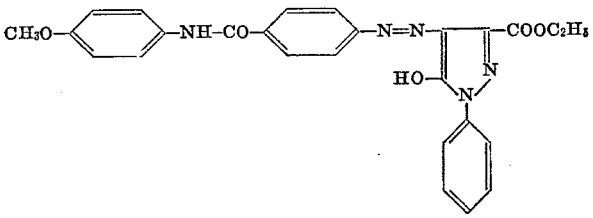

5. The compound of the formula:

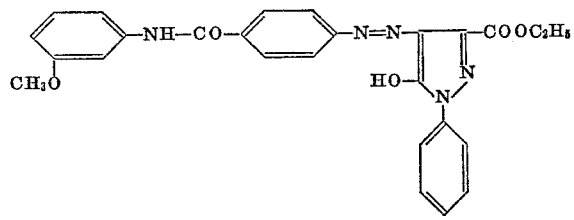

References Cited

UNITED STATES PATENTS 3,246,945   4/1966   Stanley et al. _____ 260—162 X

CHARLES B. PARKER, Primary Examiner

D. M. PAPUGA, Assistant Examiner

U.S. Cl. X.R.

8—27, 41, 55

PO-1050
(5/69)

UNITED STATES PATENT OFFICE
CERTIFICATE OF CORRECTION

Patent No. 3,511,828　　　　　　　　Dated May 12, 1970

Inventor(s) Peter Dimroth et al

It is certified that error appears in the above-identified patent and that said Letters Patent are hereby corrected as shown below:

Column 2, before Example 8, insert --

| Example No. | $R_1$ | Shade on polyester fiber |
|---|---|---|
| 7 | Meta-$CH_3$ | Yellow |

--.

SIGNED AND SEALED

SEP 1 - 1970

(SEAL)
Attest:

Edward M. Fletcher, Jr.
Attesting Officer

WILLIAM E. SCHUYLER, JR.
Commissioner of Patents